Nov. 17, 1936.  W. ASHTON  2,060,921
IDENTIFICATION TAG
Filed Oct. 21, 1935

INVENTOR.
WARD ASHTON
ATT'Y.

Patented Nov. 17, 1936

2,060,921

UNITED STATES PATENT OFFICE 2,060,921

IDENTIFICATION TAG

Ward Ashton, Ottawa, Ontario, Canada

Application October 21, 1935, Serial No. 45,954
In Canada November 23, 1934

1 Claim. (Cl. 40—3)

This invention relates to identification tags generally and more particularly to that class adapted to be attached to the ear of an animal and bear identifying characters.

More specifically, my improved identifying tag is adapted for the continuous marking of hogs while alive and when slaughtered and passed through a packing plant. To this end it has been designed and fashioned to remain intact on a hog's ear when the carcass is being dehaired, without in any way interfering with the operation of the dehairing machine.

Heretofore, especially in the case of hogs, it was necessary to remove the ear tags before the carcass was treated in the dehairing machines, and then to reattach them or otherwise identify the carcass. With my tag the uncertainty of identification, loss of time and labour thus involved is entirely eliminated, as the hog is marked once and for all while alive to ensure positive identification.

An object of the invention is to provide a tag of this description with a practically smooth uninterrupted outer surface.

With the foregoing and other objects the invention comprises an identification tag for the ears of animals, particularly hogs, stamped from a single length of flat metal bent to form a pair of flat closely aligned diverging arms, so spaced as to conform with the thick and thin portions of the animal's ear, one of said arms being provided with a transverse slot adjacent its free end and the other of said arms being bent inwardly adjacent its free end, tapered to a piercing tip and adapted to pass through the slotted arm and then be curled outwardly around the free end of said arm against the said bent end portion of the opposite arm.

The invention will be best understood by reference to the following description when taken in connection with the accompanying illustration of a specific embodiment thereof, while the scope of the invention will be more particularly pointed out in the claim.

Referring now to the drawing and to the embodiment of the invention therein disclosed for illustrative purposes only, and in which like numerals of reference indicate corresponding parts in each figure.

Figure 1:
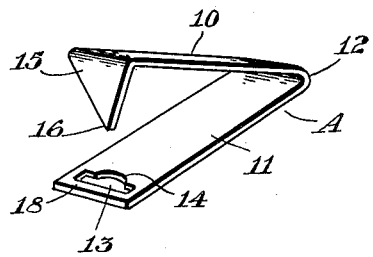
Fig. 1 is a perspective view of the tag open.

Referring more particularly to the drawing, A designates the tag as a whole, which is designed to carry identifying characters and to be clinched in the ear of an animal, such as a hog. The tag consists of a single length or piece of pliable, and preferably flat metal, bent substantially midway on itself to define the diverging arms 10 and 11 in substantially close proximity to one another to lie flat against the inside and the outside of the animal's ear.

The arm 11, which may be conveniently termed the lower arm of the tag is formed adjacent its free end with a transverse slot or opening 13 provided, as in the example here shown, with an indent or recess 14, while the other or upper arm 10 is tapered, as at 15, and terminates in the piercing tip 16. The tapered tip portion 15 is bent inwardly at an angle, as at 17, to the arm 10, from which it springs, to register with the slot or opening 13 in the arm 11, through which it is passed, to be clinched or curled outwardly around the free end 18 of the slotted arm 11, and then inwardly against the bent tapered end portion 17 of the arm 10, (see Fig. 2).

The indent or recess 14 in the slot 13 is adapted to facilitate the passing through of the piercing tip 16.

Figure 2:
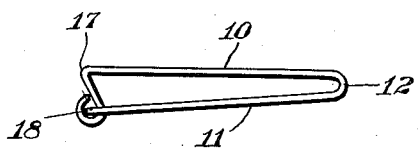
Fig. 2 is a side elevation of the tag closed.
Figure 3:
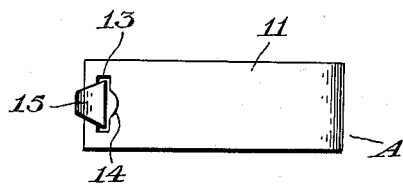
Fig. 3 is a plan view of the tag closed.

In applying the tag it is placed in open position, as shown in Fig. 1, between the jaws of an affixing tool or pliers (not shown), with the bent piercing tip 16 of the upper arm 10 registering with the slot 13 in the lower arm 11. The ear of the animal to be tagged is then presented between the arms, and the jaws of the pliers forced together, causing the piercing tip 16 to pierce the ear, and then pass through the slot 13 and be clinched or curled around, as shown in Figs. 2 and 3, outside the free end 18 of the lower arm 11 of the tag, and back against the bent end portion of the arm 17 between the two arms, thus providing a continuous smooth flat outer surface for the clinching tag, thereby permitting it on the carcass of the animal to pass intact through a dehairing machine, and without interfering with the normal efficient operation of such machine.

From the foregoing it will be observed that I have invented a simple, inexpensive and efficient identification tag for the ears of animals particularly those that may be subsequently slaughtered, and the carcass dehaired in a packing plant, and in regard to which positive means of identification when passing through such a plant, in the form of my improved tag, materially assists in speeding up operations.

As various forms of the device may suggest themselves to those skilled in the art, it is not intended that this application should be limited to the particular example disclosed, and modifications may, therefore, be made in it within the scope of the claim without departing from the spirit and scope thereof.

What I claim for my invention is:

An ear tag for animals comprising a flat metallic strip bent upon itself to form two arms in substantially V shape and spaced apart to conform with the thick and thin portions of the animal's ear, one arm being provided with a transverse recessed slot, the other with a tapered piercing tip, inclined inwardly to strike the ear of the animal perpendicularly and to pass through the slotted end and then to be clinched about the outer surface of said end so that the arms are still diverging and conform to the thick and thin portions of the animal's ear.

WARD ASHTON.